US006108979A

United States Patent [19]

Saffran et al.

[11] Patent Number: 6,108,979

[45] Date of Patent: Aug. 29, 2000

[54] VEHICLE HANDLE LINEAR PULL ACTION

[75] Inventors: Peter A. Saffran, Windsor, Canada; Glenn W. Abbott, West Bloomfield; James Kavanaugh, Northville, both of Mich.

[73] Assignees: DaimlerChrysler Corporation, Auburn Hills, Mich.; Siegel-Robert, Inc., St. Louis, Mo.

[21] Appl. No.: 08/947,954

[22] Filed: Oct. 9, 1997

[51] Int. Cl.$^{7}$ .......... B60J 5/10

[52] U.S. Cl. .......... 49/503; 292/336.3; 74/104; 74/501.6; 74/502; 74/543; 74/528; 74/545

[58] Field of Search .......... 296/56, 146.1, 296/57.1; 49/394, 502, 503; 292/201, 216, 336.3, DIG. 23, DIG. 43; 74/102, 104, 105, 501.6, 502, 528, 543, 545; 312/218, 222, 332.1; 70/208

[56] References Cited

U.S. PATENT DOCUMENTS

| | | | |
|---|---|---|---|
| 2,218,960 | 10/1940 | Rightmyer | 292/1 |
| 3,401,998 | 9/1968 | Evans et al. | 312/215 |
| 3,507,132 | 4/1970 | Schwenk | 70/224 |
| 4,129,325 | 12/1978 | Hern et al. | 292/127 |
| 4,486,041 | 12/1984 | Takasaki | 292/221 |
| 4,834,433 | 5/1989 | Keller | 292/336.3 |
| 5,071,179 | 12/1991 | Brackmann | 292/216 |
| 5,295,374 | 3/1994 | Bender et al. | 70/208 |
| 5,451,089 | 9/1995 | Bender | 296/57.1 |

*Primary Examiner*—D. Glenn Dayoan
*Assistant Examiner*—Paul Chenevert
*Attorney, Agent, or Firm*—James R. Yee

[57] ABSTRACT

A handle assembly for a motor vehicle door operative for selectively releasing a latch mechanism. The handle assembly includes a mounting portion attached to the motor vehicle door and a handle proper adapted to be manually grasped. The handle proper is linearly translatable between a first position and a second position for releasing the latch mechanism. In a preferred form, the handle proper is biased to the first position by a coil spring.

16 Claims, 3 Drawing Sheets

VEHICLE HANDLE LINEAR PULL ACTION

BACKGROUND OF THE INVENTION

1. Field of the Invention

The present invention relates generally to articulating doors for motor vehicles, and more particularly to a handle for an articulating door of a motor vehicle having a linear pull action.

2. Discussion

It is well known in motor vehicle doors to provide a latch for latching the door in a closed position. It is also well known to provide a handle on the outside of the vehicle which is connected to the door latch by a suitable linkage so that operating the handle will release the door latch to permit opening of the door. Such handles are typically comprised of a lever which is rotated, or a button which is pushed, in order to actuate the linkage. Conventional door handle assemblies, either of the push button type or pull out type, typically include a series of bell-cranks for converting the movement of the push button or the handle transversely of the vehicle door into movement to operate the vehicle door latch.

It would be desirable to provide a new and improved door handle arrangement which would incorporate a linear pull action for operating a latching mechanism.

SUMMARY OF THE INVENTION

The present invention provides a new and improved vehicle door handle which improves upon prior known arrangements by efficiently incorporating a linear pull action. In one form, the present invention provides a handle assembly for selectively releasing a latch mechanism of a vehicle door. The vehicle door is mounted to a vehicle body for pivotal movement about an axis of rotation. The handle assembly includes a mounting portion attached to the vehicle door. The handle assembly further includes a handle proper operatively interconnected with the mounting portion and the latch mechanism. The handle proper is linearly translatable from a first position to a second position for releasing the latch mechanism.

In another form, the present invention provides a door assembly for mounting to a body of a motor vehicle for pivotal movement about an axis of rotation between an opened position and a closed position. The door assembly includes the door frame and a latch mechanism for selectively interconnecting a portion of the door frame with the body. The door assembly further includes a handle assembly attached to the door frame and interconnected with the latch mechanism. The handle assembly includes a manually controlled element linearly displaceable from a first position to a second position for releasing the latch mechanism.

BRIEF DESCRIPTION OF THE DRAWINGS

Additional objects and advantages of the present invention will become apparent from a reading of the following detailed description of the preferred embodiment which makes reference to the drawings of which.

DETAILED DESCRIPTION OF THE PREFERRED EMBODIMENT

Figure 1:
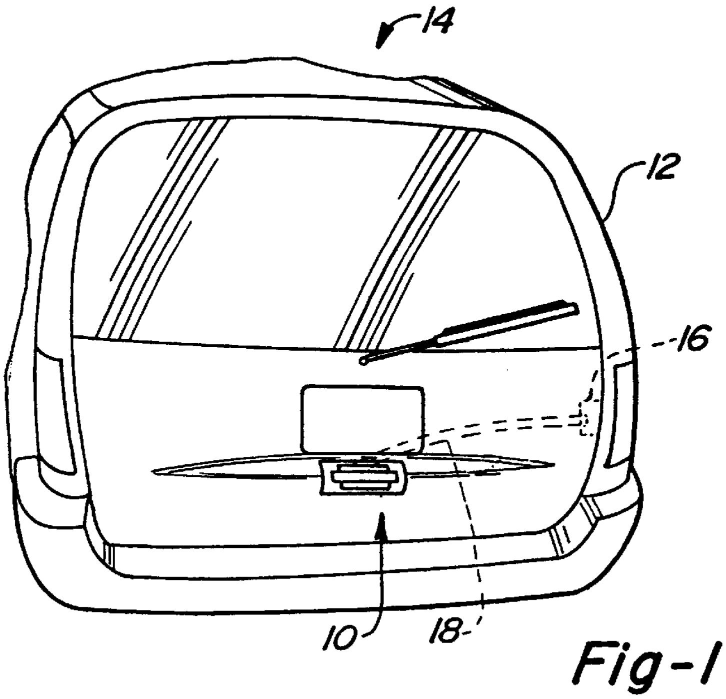
FIG. 1 is an environmental view of a handle assembly constructed in accordance with a preferred embodiment of the present invention shown incorporated into a rear liftgate of a motor vehicle.

With initial reference to FIG. 1, a handle assembly constructed in accordance with the preferred embodiment of the present invention is shown operatively associated with a handle assembly 10 of vehicle door 12. The vehicle door 12 shown is a rear tailgate for a minivan, sport utility or other vehicle 14, which is otherwise of conventional construction. The particular vehicle door 12 illustrated should be considered exemplary, as the teachings of the present invention are applicable for virtually any type of vehicle door.

Prior to addressing the construction and operation of the handle assembly 10 of the present invention, a brief understanding of the exemplary vehicle door 12 is warranted. While not specifically shown, it will be understood that the vehicle door 12 is mounted to the body of the vehicle 14 for pivotal movement about a horizontal axis adjacent a top of the door 12. The vehicle door 12 is movable between an open position (not shown) and a closed position (shown in FIG. 1). The handle assembly 10 is interconnected with a latching mechanism 16 through a cable 18. The latching mechanism 16 is of conventional construction and operates to release a striker (not shown) carried by the vehicle body when activated to permit movement of the vehicle door 12 from its closed position.

Turning now to FIGS. 2–7, the handle assembly of the present invention 10 will be described in detail. The handle assembly 10 is shown to generally include a handle proper 20, a base 22, a mounting plate 24 and a control linkage 26 interconnecting the handle proper 20 with the cable 18.

Figure 2:
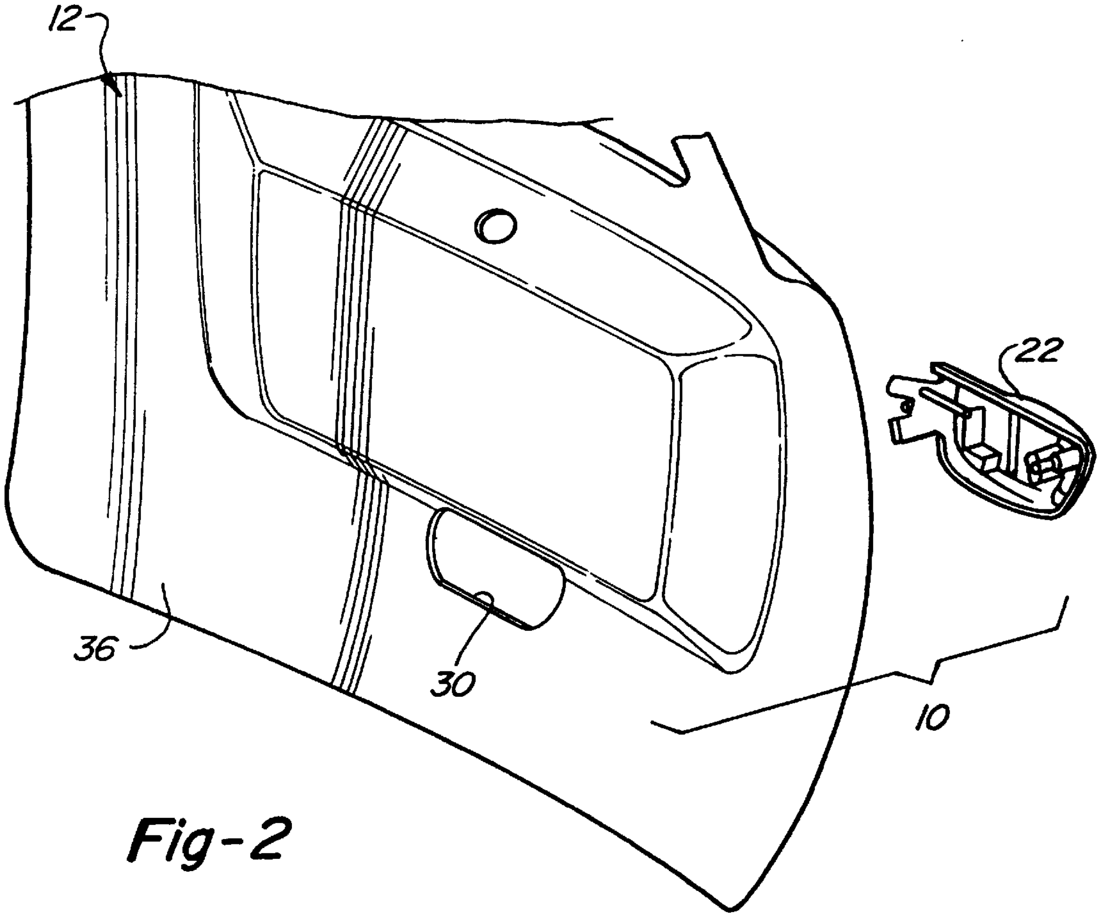
FIG. 2 is a partially exploded view of the handle assembly of the present invention.
Figure 3:
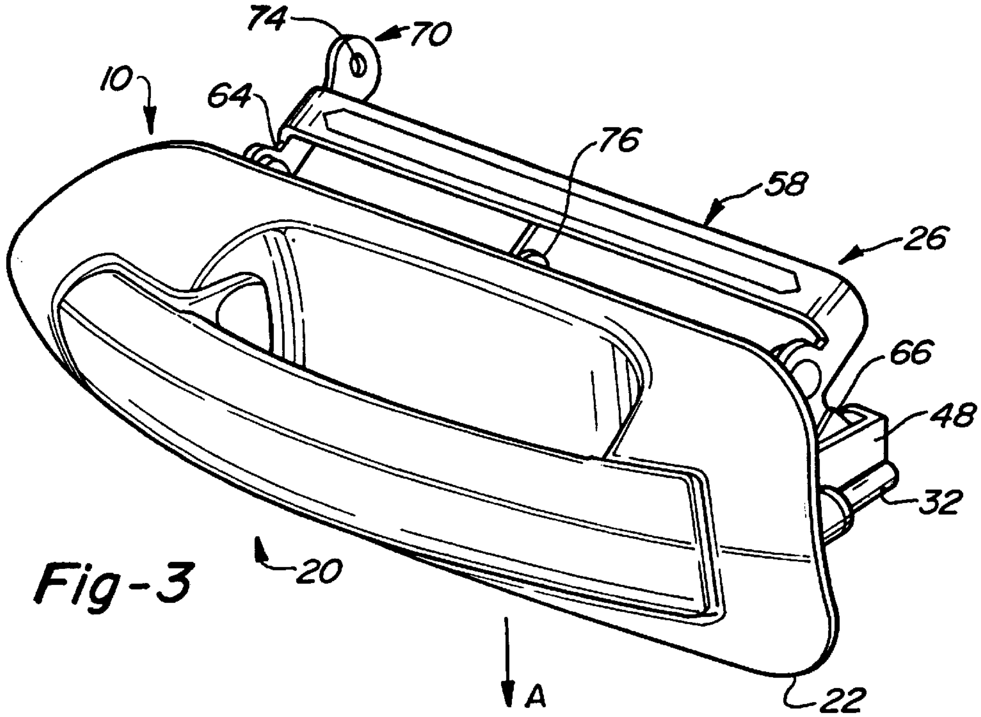
FIG. 3 is a front perspective view of the handle assembly of the present invention.
Figure 4:
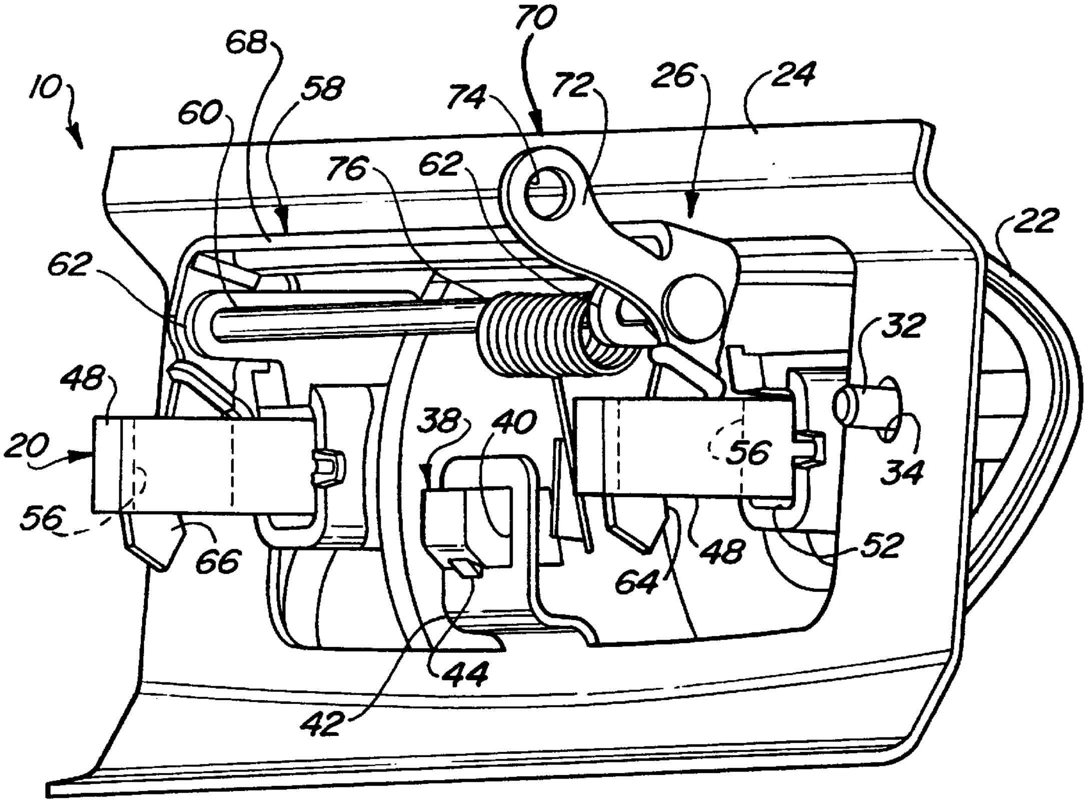
FIG. 4 is a rear perspective view of the handle assembly of the present invention.

As shown most specifically in FIGS. 2 and 4, the handle assembly 10 is mounted through an elongated aperture 30 provided in the vehicle door 12. The base 22 includes a pair of rearwardly extending locating members 32 adapted to pass through the aperture 30 and engage holes 34 formed in the mounting plate 24. The mounting plate 24 is intended to be placed flush against an inner side 36 of the vehicle door 12. The base 22 is further shown to preferably include a retaining member 38 which is received within an aperature 40 formed in a tab 42 of the mounting plate 24. The retaining member 38 includes a deflectable portion 44 which allows the retaining member 38 to be easily inserted within the aperture 40 but prevents withdrawal.

Figure 5:
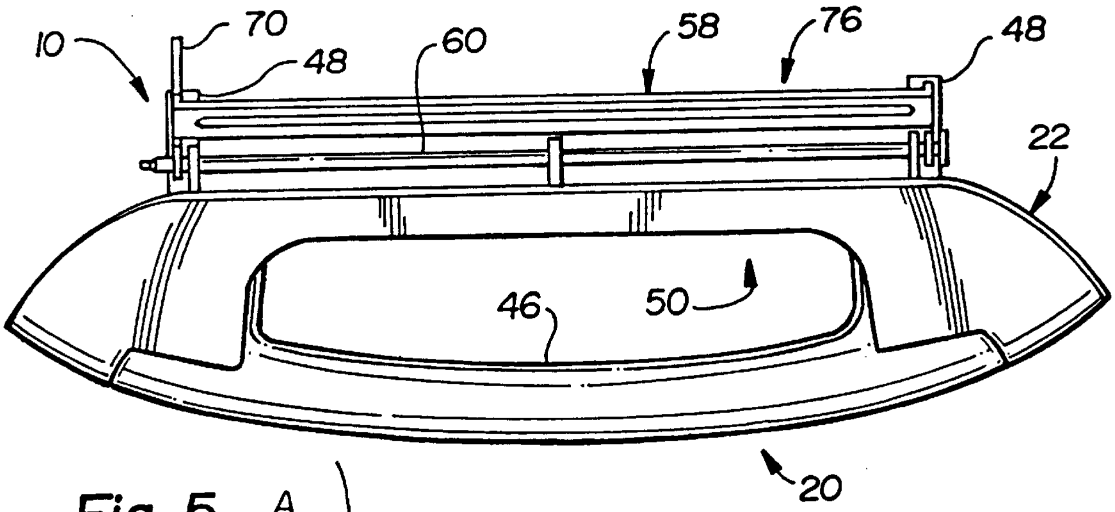
FIG. 5 is a top view of the handle assembly of the present invention.

The handle proper 20 is shown to include an elongated gripping portion 46 and a pair of rearwardly extending legs 48 cooperatively engaged with the control linkage 26. A longitudinal axis of the gripping portion 46 is disposed generally horizontally and thus parallel to the axis of door rotation. As seen in FIG. 5, the gripping portion 46 is slightly curved in top view, thereby providing comfort to the user and thereby contributing to an aesthetically pleasing vehicle appearance. An area 50 for receiving the operator's fingers is defined between the griping portion 46 and the base 22.

Figure 6:
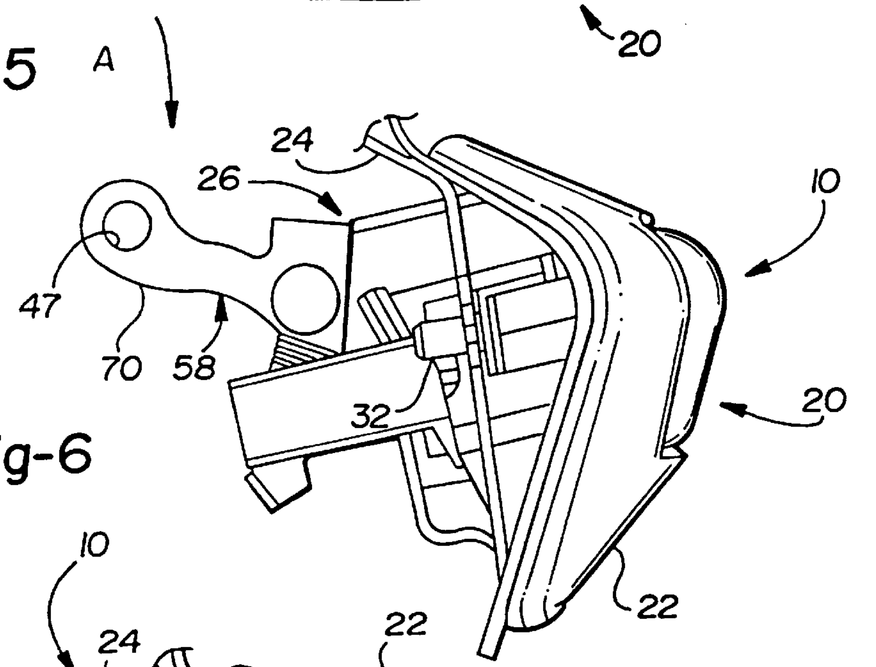
FIG. 6 is a side view of the handle assembly of the present invention illustrated in a latched position.
Figure 7:
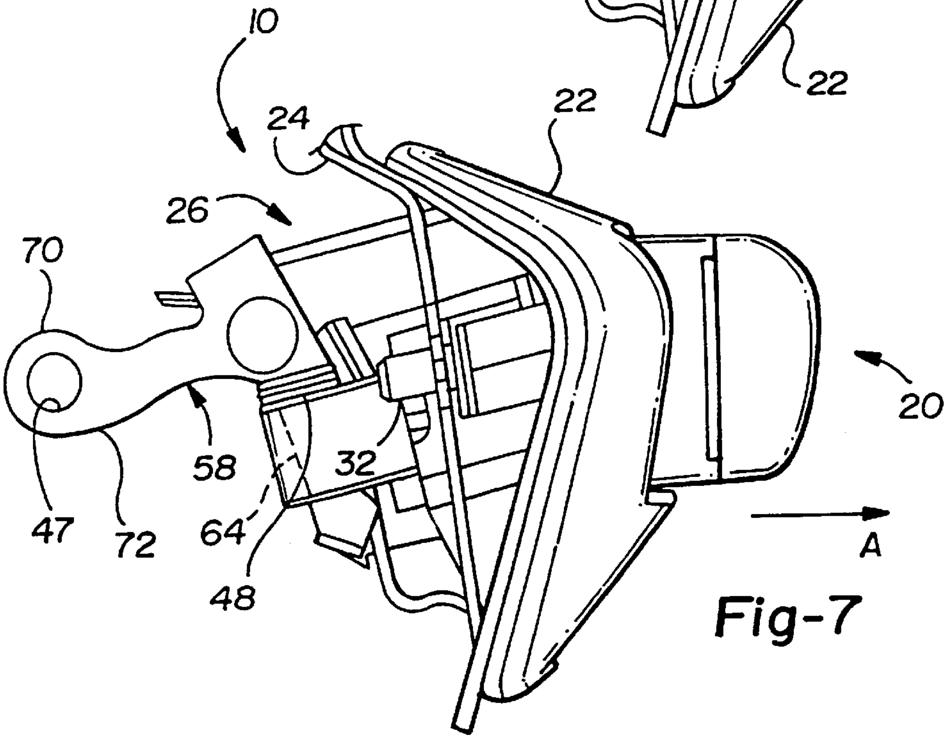
FIG. 7 is a side view of the handle assembly of the present invention illustrated in a unlatched position.

The legs 48 of the handle proper 20 are linearly translatable within channels 52 defined by the base 22. That is, the handle proper 20 is linearly movable between a first position (as shown in FIG. 6) in which the latching mechanism 16 is closed and a second position (as shown in FIG. 7) which the latching mechanism is open. The linear direction of movement of the handle proper 20 is identified in FIG. 5 and FIG. 7 with arrow A. As will become more apparent below, both of the rearwardly extending legs 48 of the handle proper 20 are formed to include recesses 56 passing vertically therethrough (shown in phantom lines in FIG. 4) for cooperating with the control linkage 26.

The control linkage 26 includes a bell-crank assembly 58 mounted for pivotal movement about an axis substantially parallel to the longitudinal axis of the gripping portion 46 of the handle proper 20. A pivot axis for the bell-crank assembly 58 is defined by an elongated pivot rod 60 passing through apertures formed in mounting flanges 62. The ends of the pivot rod 60 pass through apertures (not shown) in the bell-crank assembly 58.

The bell-crank assembly 58 is further shown to include a generally U-shape member having first and second lever arms 64 and 66 joined by an intermediate portion 68. The ends of the lever arms 64 and 66 pass through the vertical recesses 56 provided in the rearwardly extending legs 48 of the handle proper 20.

As shown more specifically in FIG. 4, the bell-crank assembly 58 is shown to further include a connecting portion 70 for connecting the bell-crank assembly 58 with the cable 18. This construction in other arrangements may be to a rod or other suitable latch actuating means. In the embodiment illustrated, the connecting portion 70 includes an arm 72 extending from one of the lever arms 64. The arm 72 terminates in an aperture 74 which facilitates connection to the cable 18 in a conventional manner.

The handle assembly 10 of the present invention is further shown to include a biasing member 76 for biasing the handle assembly 10 to its first position and thereby the latching mechanism 16 to its closed position. In the embodiment illustrated, the biasing mechanism is a coil spring 76 which surrounds the pivot rod 60. The coil spring functions to bias the bell-crank assembly 58 in a counterclockwise direction (as shown in FIG. 7).

The operation of the handle assembly 10 may now be understood referring generally to FIGS. 1–7 and specifically to FIGS. 6 and 7. As the handle proper 20 is linearly moved from its first position (as shown, for example, in FIGS. 5 and 6) to its second position (as shown in FIG. 7) the rearwardly extending legs 48 retract, thereby overcoming the biasing force of the coil spring 76 and causing the bell-crank assembly 58 to rotate clockwise (as shown in FIG. 7). The lever arms 64 and 66 of the bell-crank assembly 58 provide a mechanical advantage for operating the latch mechanism 18. The rotational movement of the bell-crank assembly 58 is converted to linear motion through the cable 18 which serves to release the latching mechanism 16. When the handle proper 20 is released, the biasing force of the coil spring 72 returns to the handle proper 20 to its first position and thereby returns the latching mechanism 16 to its closed position.

While the above description constitutes the preferred embodiment of the invention, it will be appreciated that the invention is susceptible to modification, variation, and change without departing from the proper scope or fair meaning of the accompanying claims. For example, it will be understood that the handle proper 20 may be mounted to the vehicle door 12 such that it is oriented in a generally vertical manner. Such an arrangement may be particularly desirable for vehicle doors mounted for pivotal movement about a vertical axis.

What is claimed is:

1. A handle assembly for selectively releasing a latch mechanism of a vehicle door, the vehicle door mounted to a vehicle body for pivotal movement about an axis of rotation, the handle assembly comprising:

a base adapted to be attached to the vehicle door;

a rotatable element pivotally attached to the base, the rotatable element rotatable from a first position to a second position for releasing the latch mechanism; and a handle proper operatively interconnected with the rotatable element, the handle proper being linearly translatable such that linear translation of the handle proper causes the rotatable element to rotate from its first position to its second position so as to release the latch mechanism the handle proper being generally U-shaped having first and second ends which extend generally perpendicular to a central portion;

wherein the rotatable element includes first and second legs each defining a recess receiving a respective one of the first and second legs of the rotatable element.

2. The handle assembly for selectively releasing a latch mechanism of a vehicle door of claim 1, further comprising a biasing member for biasing the rotatable element to its first position.

3. The handle assembly for selectively releasing a latch mechanism of a vehicle door of claim 2, wherein the biasing member includes a coil spring acting upon the rotatable element.

4. The handle assembly for selectively releasing a latch mechanism of a vehicle door of claim 1, wherein the central portion of the handle defines an axis adapted to be substantially parallel to the axis of rotation.

5. The handle assembly for selectively releasing a latch mechanism of a vehicle door of claim 1, wherein the rotatable element includes a bell-crank assembly operatively interconnected to the first end of the handle proper such that linear displacement of the handle proper causes rotation of the bell-crank assembly.

6. In a vehicle door having a handle assembly for selectively releasing the latch mechanism of a vehicle door, the vehicle door mounted to a vehicle body for pivotal movement about an axis of rotation, the handle assembly comprising:

a base attached to the vehicle door;

a rotatable element pivotally attached to the base, the rotatable element rotatable from a first position to a second position for releasing the latch mechanism; and a handle proper operatively interconnected with the rotatable element, the handle proper being linearly translatable such that linear translation of the handle proper causes the rotatable element to rotate from its first position to its second position so as to release the latch mechanism, the handle proper being generally U-shaped having first and second ends which extend generally perpendicular to a central portion;

the rotatable element includes first and second legs each defining a recess receiving a respective one of the first and second legs of the rotatable element.

7. The handle assembly for selectively releasing a latch mechanism of a vehicle door of claim 6, further comprising a biasing member for biasing the rotatable element to its first position.

8. The handle assembly for selectively releasing a latch mechanism of a vehicle door of claim 7, wherein the biasing member includes a coil spring acting upon the rotatable element.

9. The handle assembly for selectively releasing a latch mechanism of a vehicle door of claim 6, wherein the central portion of the handle defines an axis adapted to be substantially parallel to the axis of rotation.

10. The handle assembly for selectively releasing a latch mechanism of a vehicle door of claim 6, wherein the rotatable element includes a bell-crank assembly operatively interconnected to the first end of the handle proper such that linear displacement of the handle proper causes rotation of the bell-crank assembly.

11. A handle assembly for selectively releasing a latch mechanism of a vehicle door, the vehicle door mounted to a vehicle body for pivotal movement about a pivot axis, the handle assembly comprising:

a base adapted to be attached to the vehicle door;

a rotatable element pivotally attached to the base, the rotatable element rotatable about an axis of rotation from a first position to a second position for releasing the latch mechanism; and a handle proper operatively interconnected with the rotatable element, the handle proper being linearly translatable such that linear translation of the handle proper causes the rotatable element to rotate from its first position to its second position so as to release the latch mechanism, the handle proper being generally U-shaped with first and second ends which extend generally perpendicular to a central portion, the central portion being oriented substantially parallel to the axis of rotation.

12. The handle assembly for selectively releasing a latch mechanism of a vehicle door of claim 11, wherein the rotatable element includes first and second legs interconnected to the first and second ends of the handle proper, respectively.

13. The handle assembly for selectively releasing a latch mechanism of a vehicle door of claim 12, wherein the first and second ends of the handle proper each define a recess receiving a respective one of the first and second legs.

14. The handle assembly for selectively releasing a latch mechanism of a vehicle door of claim 11, further comprising a biasing member for biasing the rotatable element to its first position.

15. The handle assembly for selectively releasing a latch mechanism of a vehicle door of claim 14, wherein the biasing member includes a coil spring acting upon the rotatable element.

16. The handle assembly for selectively releasing a latch mechanism of a vehicle door of claim 11, wherein the rotatable element includes a bell-crank assembly operatively interconnected to the first end of the handle proper such that linear displacement of the handle proper causes rotation of the bell-crank assembly.

* * * * *